United States Patent
Basta et al.

(10) Patent No.: US 12,136,115 B2
(45) Date of Patent: Nov. 5, 2024

(54) SYSTEMS AND METHODS FOR DYNAMIC INTERFACE GENERATION FOR COMMERCE PLATFORM ONBOARDING

(71) Applicant: Stripe, Inc., South San Francisco, CA (US)

(72) Inventors: Matthew Basta, Chicago, IL (US); Ryan Orbuch, San Francisco, CA (US)

(73) Assignee: STRIPE, INC., South San Francisco, CA (US)

( * ) Notice: Subject to any disclaimer, the term of this patent is extended or adjusted under 35 U.S.C. 154(b) by 0 days.

(21) Appl. No.: 18/205,978

(22) Filed: Jun. 5, 2023

(65) Prior Publication Data

US 2023/0325895 A1    Oct. 12, 2023

Related U.S. Application Data

(63) Continuation of application No. 17/834,685, filed on Jun. 7, 2022, now Pat. No. 11,710,159, which is a continuation of application No. 16/725,584, filed on Dec. 23, 2019, now Pat. No. 11,354,714.

(51) Int. Cl.
| | |
|---|---|
| G06Q 30/0601 | (2023.01) |
| G06F 3/0481 | (2022.01) |
| G06F 3/0482 | (2013.01) |
| G06F 9/451 | (2018.01) |
| G06F 16/23 | (2019.01) |
| G06F 40/174 | (2020.01) |

(52) U.S. Cl.
CPC ....... *G06Q 30/0601* (2013.01); *G06F 3/0481* (2013.01); *G06F 3/0482* (2013.01); *G06F 9/451* (2018.02); *G06F 16/2379* (2019.01); *G06F 40/174* (2020.01)

(58) Field of Classification Search
CPC ...... G06F 3/0481; G06F 3/0482; G06F 9/451; G06F 40/174; G06F 16/2379; G06Q 30/0601

See application file for complete search history.

(56) References Cited

U.S. PATENT DOCUMENTS

| | | |
|---|---|---|
| 10,318,941 B2 | 6/2019 | Chawla et al. |
| 2005/0209903 A1 | 9/2005 | Hunter et al. |
| 2007/0094199 A1 | 4/2007 | Deshpande et al. |
| 2007/0198373 A1 | 8/2007 | Metcalfe |
| 2008/0270597 A1 | 10/2008 | Tenenti |

(Continued)

*Primary Examiner* — Eric J. Bycer
(74) *Attorney, Agent, or Firm* — Lewis Roca Rothgerber Christie LLP (57) ABSTRACT

A method and apparatus for generating one or more user interfaces are described. The method includes transmitting a request for creating a merchant account that onboards the merchant for use of services provided by the commerce platform system. The method includes in response to executing an onboarding user interface received from the commerce platform, establishing a merchant context for the merchant account in a memory of the merchant system, where the merchant context stores a local copy of merchant account data for the merchant account. Furthermore, the method includes determining, based on data stored in the merchant context, a composition that renders one of a plurality of different user interfaces for collecting a set of the merchant account data associated with the composition, and determining a subset of merchant account data that is required to comply with a minimum set of account information.

20 Claims, 7 Drawing Sheets

(56) References Cited

U.S. PATENT DOCUMENTS

| | | |
|---|---|---|
| 2010/0332973 A1 | 12/2010 | Kloiber et al. |
| 2011/0004550 A1 | 1/2011 | Giordano et al. |
| 2012/0054095 A1 | 3/2012 | Lesandro et al. |
| 2014/0297535 A1 | 10/2014 | Pinsker et al. |
| 2016/0162172 A1 | 6/2016 | Rathod |
| 2016/0188560 A1 | 6/2016 | Chen |
| 2017/0034256 A1 | 2/2017 | Lerner |

SYSTEMS AND METHODS FOR DYNAMIC INTERFACE GENERATION FOR COMMERCE PLATFORM ONBOARDING

RELATED APPLICATIONS

This application is a continuation of U.S. patent application Ser. No. 17/834,685, filed Jun. 7, 2022, which is a continuation of U.S. patent application Ser. No. 16/725,584, filed Dec. 23, 2019, the disclosures of which are incorporated by reference herein in their entireties.

BACKGROUND

Merchants, such as grocers, car services, dry cleaning services, etc., provide their products and services to consumers. Such merchants often employ agents to deliver their products and/or provide the actual services. For example, a person acting on the merchant's behalf will drive a consumer in their own car, deliver food ordered through a merchant website, pick up and/or drop off clothes dry cleaned by the merchant, etc.

These merchants, although providing a system for supplying products and/or services to consumers through their agents, often do not perform the financial processing associated with the merchant transactions. Instead, merchants utilize commerce systems to process financial transactions for the products and/or services provided to consumers through their agents. This may include the merchant, agent, and other users establishing accounts with the commerce system. Once the accounts are established, merchants can run financial transactions using the services of the commerce system, the agents can accept payments from customers on behalf of the merchant for provided products and/or services, and the commerce system processes the accepted payments, performs payouts for services rendered, as well as other financial processing services. This processing may include running credit cards, crediting a merchant account for the transaction, crediting the agent responsible for the transaction, debiting a commerce system fee for processing the transaction on behalf of the merchant, interacting with authorization network systems (e.g., bank systems, credit card issuing systems, etc.), as well as performing other commerce related transactions for the merchant and/or agent such as providing payouts for products/services rendered on behalf of a merchant.

Establishing accounts, often referred to as onboarding, for new users to a commerce system is often associated with significant problems and potentially presents barriers to onboarding a new user. For example, account information across all account types for a commerce platform consists of a significant number of individual pieces of data, such as names, addresses, directorships, ownership, banking information, credit card information, citizenship, government identifiers, and so on. Each of these types of information may not be relevant to all account types, and thus requiring a user to provide non-relevant data may unnecessarily complicate and extend the onboarding process. Furthermore, providing a user interface for remotely providing such information (e.g., a web based onboarding process) may be overly complicated when asking for such a large set of data. Additionally, engineering time required to create different onboarding interfaces for different account types increase development complexity, and potentially flexibility for onboarding flows to adapt to specific users. Thus, the efficiency of onboarding may be low, and may further consume excess engineering, compute and network bandwidth.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "generating", "determining", "transmitting", "updating", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

Figure 1:
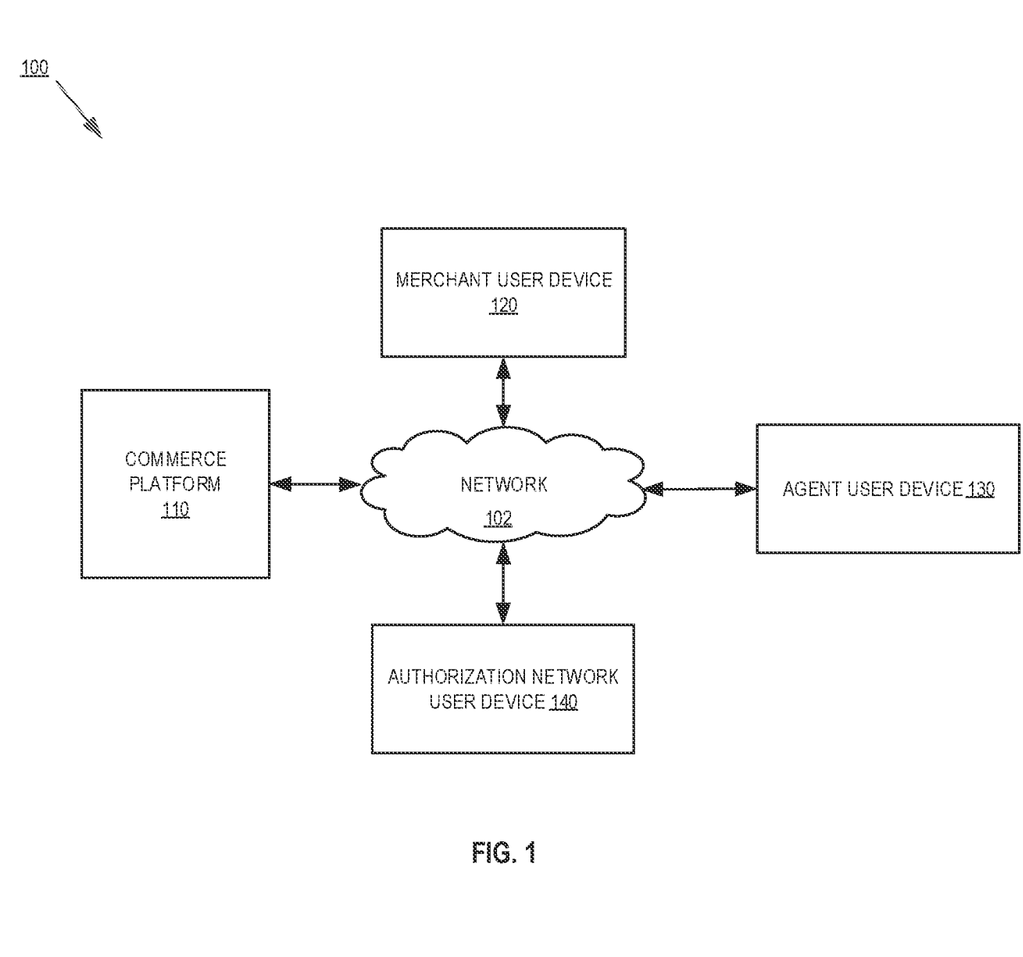
FIG. 1 is a block diagram of an exemplary system architecture for dynamic user interface generation for account onboarding for a commerce platform.

FIG. 1 is a block diagram of an exemplary system 100 architecture for dynamic user interface generation for account onboarding for a commerce platform. In one embodiment, the system 100 includes a commerce platform 110, a merchant user device 120, an agent user device 130, and an authorization network user device 140. In one embodiment, user devices (e.g., devices 120, 130, and 140) may be mobile computing devices, such as a smartphone, tablet computer, smartwatch, etc., as well computer systems, such as a desktop computer system, laptop computer system, server computer systems, etc. The commerce platform 110 may also be one or more computing devices, such as one or more server computer systems, desktop computer systems, etc.

The commerce platform 110, merchant user device 120, agent user device 130, and authorization network user device 140 may be coupled to a network 102 and communicate with one another using any of the standard protocols for the exchange of information, including secure communication protocols. In one embodiment, one or more of the commerce platform 110, merchant user device 120, agent user device 130, and authorization network user device 140 may run on one Local Area Network (LAN) and may be incorporated into the same physical or logical system, or different physical or logical systems. Alternatively, the commerce platform 110, merchant user device 120, agent user device 130, and authorization network user device 140 may reside on different LANs, wide area networks, cellular telephone networks, etc. that may be coupled together via the Internet but separated by firewalls, routers, and/or other network devices. In one embodiment, commerce platform 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, commerce platform provides financial processing services to one or more of merchant user device 120, agent user device 130, and/or authorization network user device 140, such as managing accounts, running financial transactions, clearing transactions, performing payouts to agents, managing merchant and/or agent accounts, as well as other services typically associated with commerce platforms systems such as, for example, STRIPE™. However, before providing such services, the merchant user device 120, agent user device 130, and/or authorization network user device 140 participate in an onboarding process in which a user of the merchant user device 120, agent user device 130, and/or authorization network user device 140 interacts with the commerce platform 110 to provide account data. Such account data includes, for example, an account type, an account owner, an account name, authorized users, banking information, credit processing information, preferences, etc. In embodiments, however, not all such possible account information is required in order to utilize the services of the commerce platform. That is, a minimum set of account data, which is less than all possible account data collectable by the commerce platform 110, may be associated with a compliance requirement of the commerce platform 110. In other words, a subset of all possible account data given an account type may be associated with a compliance state for a new account such that once a minimum of the account data that brings the new account into the compliance state is received by the commerce platform 110 during account onboarding, the associated account is enabled to use the services of the commerce platform 110. For example, once a new merchant account at the commerce platform 110 has provided the minimum set of account data necessary to satisfy the minimum compliance state for a merchant account type (e.g., as opposed to a minimum compliance state and associated account data for an agent account type, authorization network account type, etc.), the merchant may run transactions using the commerce platform 110, use the merchant to clear transaction with, for example, authorization network systems, sign up merchant affiliated agents for providing services on behalf of the merchant, etc.

As discussed herein, there may be any number of different types of accounts. For example, there may be a plurality of different merchant account types for different merchants (e.g., privately held corporations, sole proprietorships, public corporations, partnerships, etc.), a plurality of different types of agent accounts (e.g., single accounts associated with a single merchant, an agent that is associated with more than one merchant users of the commerce platform, etc.), a plurality of different authorization network account types (e.g., credit card issuing accounts, card transaction clearance accounts, banking system accounts, etc.), as well as any number of different types of accounts for systems that may utilize the services of the commerce platform 110. In order to avoid obscuring the embodiments of the present invention, the below description will focus on providing dynamic onboarding user interfaces for onboarding merchant accounts. However, the embodiments discussed herein are not limited to onboarding merchant accounts, and instead can be utilized for onboarding any number of different account types for the commerce platform 110.

In embodiments, commerce platform 110 is configured to dynamically generate one or more onboarding user interfaces that collect a subset of merchant account data. In embodiments, the subset of account data is a subset of all possible account data that can be collected by commerce platform 110 during account onboarding, but which is a minimum number/amount/type of data that satisfies compliance requirements for a new account. In embodiments, the data associated with the compliance requirements is data that is legally required to be collected by the commerce platform 110 (e.g., data defined by related regulations that commerce platform 110 is to collect before providing services to a merchant), logically required to be collected by the compliance platform 110 (e.g., data that commerce platform 110 will use, at a minimum, to provide services to a merchant and establish merchant accounts), or some combination of compliance related account data. Because the onboarding focuses on collection of the subset of account data, which is minimum account data that is needed to satisfy a compliance state for a new account, the time of the onboarding process is reduced, network bandwidth consumed during onboarding is consequently reduced by providing the minimized onboarding process, and complexity in the development and participation in the onboarding process is also reduced.

After collecting the subset of account data, as discussed in greater detail herein, a merchant may later supply additional account data as desired and/or required.

Figure 2:
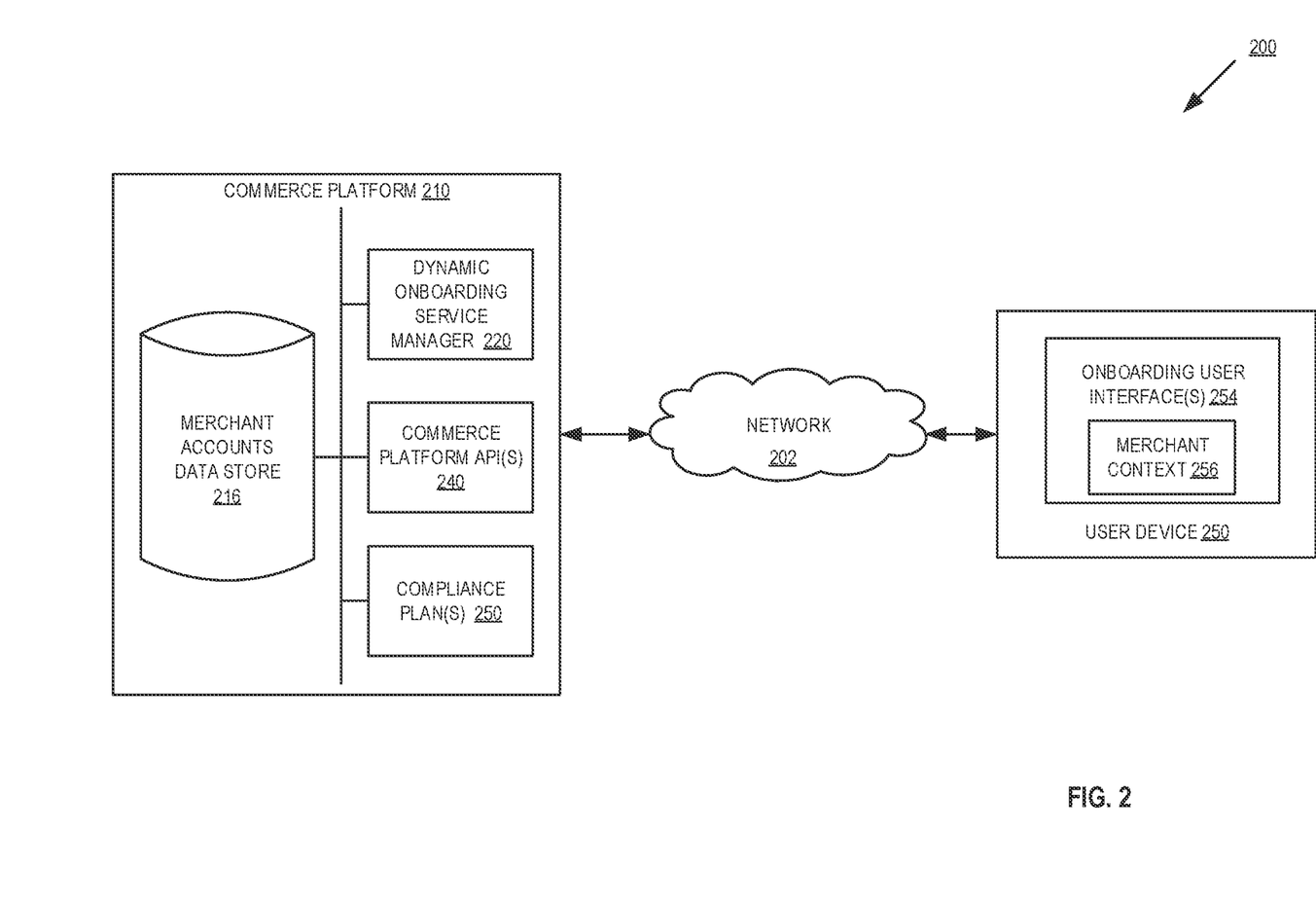
FIG. 2 is a block diagram of one embodiment of a commerce platform providing dynamic onboarding to a user device.

FIG. 2 is a block diagram of one embodiment 200 of a commerce platform 210 providing dynamic onboarding to a user device 250. Commerce platform 210 and user device 250 provide additional details for the corresponding devices/systems discussed above in FIG. 1.

In one embodiment, commerce platform 210 includes a dynamic onboarding service manager 220, one or more commerce platform application programming interfaces (APIs) 240, one or more compliance plans 250, and an accounts data store 216. User device 250, which may be any of merchant user device 120, agent user device 130, or authorization network user device 140 as discussed above in FIG. 1, includes onboarding user interface(s) 154 rendered by the user device 250, for example within a web browser, mobile web browser, application, etc. running on user device 250. In embodiments, a merchant context 256 is maintained by onboarding user interface(s) 254 in a memory of user device 250.

As discussed above, user device 250 will initiate the establishment of an account with commerce platform 210 to enable the user of services provided by the commerce platform 210. For example, and to illustrate embodiments of the present invention, user device 250 may be a user device associated with a merchant system that is being used to create/onboard a merchant account for using payment processing services of the commerce platform 210. The account may be a new account, an expansion of an existing account, or other account addition/modification for which onboarding may occur. Furthermore, in embodiments, the commerce platform 210 and user device 250 communicate with each other over various networks and network configurations as discussed above in FIG. 1.

In an embodiment, dynamic onboarding service manager 220 may generate an initial user interface, such as a web based user interface, which is transmitted to user deice 250 offering to establish a new account at commerce platform 210. In embodiments, the web based user interface generated by dynamic onboarding service manager 220 is encoded with logic to perform account onboarding as discussed herein, including performing dynamic rendering of account data collection stages, which are dynamically selected and/or configured to collect a minimum set of account data required to bring an account being onboarded into a compliance state.

In response to receipt of the web based user interface from dynamic onboarding service manager 250, user device 250 renders an initial one of a plurality of possible onboarding user interface(s) 254. Furthermore, the web based user interface allocates merchant context 256 in a memory of user device. In embodiments, merchant context 256 can be considered a client-side cache of merchant data known about an account being onboarded and/or collected during the onboarding process. In embodiments, the merchant context 256 is a data structure, such as a REACT™ context, that comprises all possible account data that is collectable by commerce platform 210. The merchant context 256 is where account details received during the dynamic onboarding discussed herein are stored locally by onboarding user interface(s) 254. As discussed herein, onboarding user interface(s) 254 may make one or more commerce platform based API requests to API(s) 240, which incurs a round-trip-time to acquire and/or access account data from merchant accounts data store 216. For example, during onboarding, an API request may be issued requesting account details, if any are known to commerce platform 210, for an identified account. However, if such information is already locally cached in merchant context 256, the API request can be avoided, thereby improving the efficiency of the onboarding process, and reducing network bandwidth consumption by having to make unnecessary API requests. In embodiments, the storage of account data in a merchant context 256 ensures that the account details are exposed to the API functions used by different system of the onboarding user interface(s) 254.

Figure 3A:
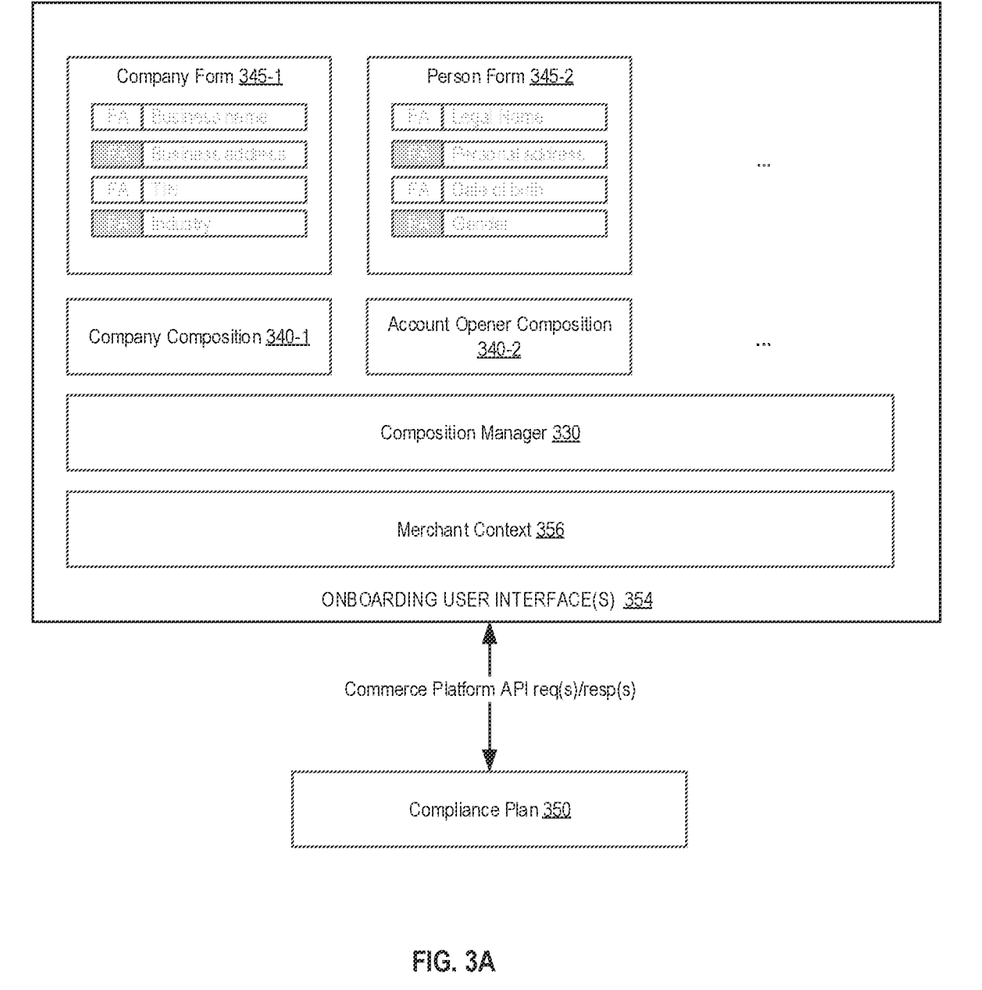
FIG. 3A is a block diagram of a dynamic onboarding service manager providing dynamic onboarding for a commerce platform.

In embodiments, and with reference to FIG. 3A, the encoded onboarding user interface(s) 354 executed by user device 250 include a composition manager 330 that determines a set of compositions (e.g., composition 340-1, 340-2, etc.) from all available compositions that are relevant to the merchant context 356 and which will be used to collect relevant account information by issuing one or more API requests and/or obtaining information from merchant context 354, as discussed in greater detail below. As discussed herein, each composition is a set of one or more encoded forms that are renderable by user device 250, such as REACT™ compositions, where the encoded forms each include user interface elements (e.g., buttons, selectors, data entry fields, submit buttons, etc.). In embodiments, there may be more compositions than those determined as relevant by composition manager 330 because all available compositions are configured to collect all possible account information. The compositions serve to divide account detail collection into logical groups or steps, and a sequence of compositions is defined by composition manager 330 from one composition to the next (e.g., 340-1 first, then 340-2 second, and so on) to provide an ordered flow of account data collection during onboarding. Then, composition manager 330 selects the set of compositions in the sequence based on the account type being established (e.g., as reflected in the merchant context 256/356 and further based on a relevant compliance plan 250/350). In embodiments, the compliance plans 250/350 define that minimum account data that is to be collected to place a new account into a compliance state so that the new account can use the services of the commerce platform 210, and are accessed via API calls issued by the compositions 340 to the commerce platform API(s) 240.

Figure 3B:
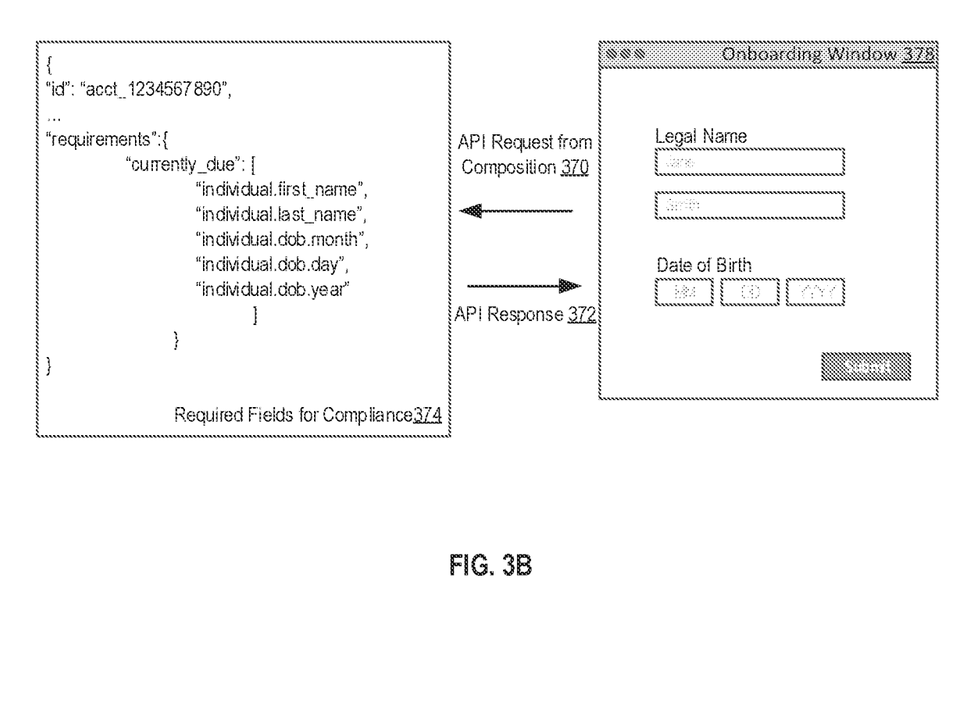
FIG. 3B is a block diagram illustrating an embodiment of dynamic generation of an onboarding user interface.

In embodiments, each composition is composed of one or more forms (e.g., company form 345-1 is part of company composition 340-1, person form is part of account opener composition 340-2, etc.). Furthermore, although not shown, a composition may be composed of two or more forms. Each form of a composition is then comprised of one or more fields, each wrapped in a field applicability wrapper having a field applicability attribute. In embodiments, the field applicability attribute is data, logic, etc. that defines whether a given field is applicable to the account being onboarded given data stored within merchant context 256/356 (e.g., storing relevant account details and account type) and the corresponding compliance plan 250/350 as determined by relevant API calls. For example, given an account being onboarded and the current stage of an onboarding flow, composition manager 330 may determine that an account opener composition 340-2 is relevant to the account being established (e.g., because a merchant context 256/356 has data stored indicating the new account should be associated with at least one person), and that fields such as legal name, personal address, and date of birth is account data that is to be collected as part of brining the new account into a compliance state. In embodiments, the applicable fields, and thus the updating of the field applicability attributes in the wrapped fields, is updated using a API based query to commerce platform API(s) 240. For example, as illustrated in FIG. 3B and with reference to FIG. 3A, account opener composition 340-2 may issue an API request 370 executed by commerce platform API(s) 240, such as creation of a new user for the account being onboarded. The new user would be allocated in merchant account's data store 216. Furthermore, the API 240 responds 372 with compliance related data, which the composition uses to update field applicability attributes for the form (e.g., person form 345-2 in the example) to be rendered by the composition (e.g., the required fields for compliance 374 indicate that legal name and date of birth are applicable to the form 345-2 to be generated by account opener composition 340-2). The resulting onboarding window 378 for the form with only applicable fields to be rendered is then rendered within the onboarding user interface 254. A user of user device enters data into the rendered form, and once submitted, the entered data is used to update the state of the merchant context 254/354, and transmitted back to commerce platform 210 in an API based message for persistent storage of the user entered data in data store 216.

In embodiments, the API request 370 for required information may also return additional information. For example, if an account having a given account ID for which the API request is issued is already associated with information for user John Doe (e.g., John Doe may be associated with a different business division as that being onboarded in the current onboarding flow, may be opening a new outlet for an existing business that he is already associated with, is already associated with the legal entity for which the onboarding is being performed, etc.), the API response 372 may further include such known information, which is written to the merchant context 256/356. Once written to the merchant context 256/356, any of the compositions can better determine whether further API calls are necessary. That is, if a prior API response had returned a known date of birth of John Doe, which was written to merchant context 254/354, then a subsequent API request may not have been necessary, and further onboarding window 378 would not render the information as the field would no longer be applicable.

It should be noted that each of the available compositions are associated with one or more form(s) having a set of data collection fields such that the compositions and forms are capable of collecting all possible account data (via the form fields) during onboarding. However, because account compliance state for different account types is associated with a subset of all possible account data, not all compositions, forms, and/or form fields within applicable forms are needed and/or selected by composition manager 330 to render and collect onboarding data via associated rendered forms during account onboarding. Thus, as discussed herein, composition manager 330 and compositions 340 utilizes the merchant context 254/354 and relevant responses generated by APIs 240 with reference to compliance plan 350 to progress an onboarding through applicable compositions (e.g., those compositions that are associated with collection of data required to satisfy a minimum compliance state for a new account), and selectively render forms with form fields associated with the specific data elements that are needed to satisfy compliance requirements (e.g., that specific data within each form that will bring an account into compliance once collected, and which is not already stored within the merchant context for the account being onboarded).

By generating an ordered sequence of compositions, an orderly flow through the onboarding process is created within onboarding user interface(s) 254/354. Furthermore, composition manager's 330 selection of a subset of all available compositions that are needed to collect compliance related account data, and their ordering, reduces the overall time, complexity, and bandwidth usage of the onboarding process. Additionally, each compositions ability to determine and cause the rendering of applicable forms and further applicable fields provides a high level of granularity and personalization for onboarding different account types, users, etc. This granularity and personalization enables onboarding user interface(s) 254/354 the ability to dynamically select compositions, forms, and fields to step an onboarding user through a sequence of user interface customized for that specific onboarding experience, and which is configured to collect the least amount of account data necessary to bring an account into compliance.

Furthermore, the compositions, forms, and form fields within the forms enable collection of all possible data for all possible account types. However, as an onboarding flow progresses, and data is added to a merchant context 256/356, subsets of compositions are selected, and forms and their relevant fields are rendered, to eliminate non-essential account collection stages, forms, and inputs. By doing so, very different account types can be given personalized onboarding experiences by the onboarding user interface(s) 254/354 provided by dynamic onboarding service manager 220/320 from the same set of available compositions, forms, and form inputs. Therefore, engineering time, deployment complexity, and compute resources are reduced for commerce platform 210 by not requiring multiple onboarding systems and/or implementations for different account types.

Figure 4:
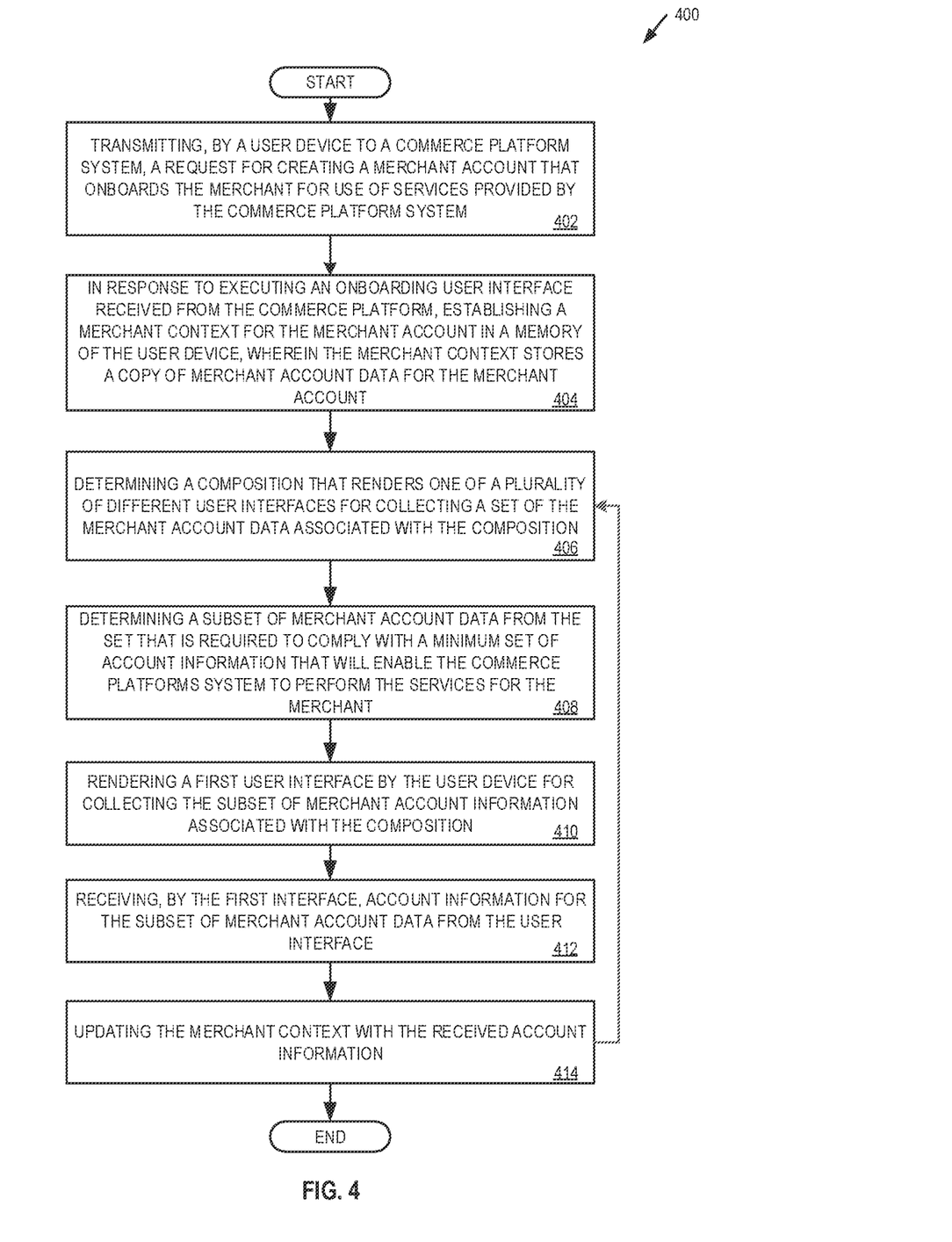
FIG. 4 is a flow diagram of one embodiment of a method for generating one or more user interfaces for onboarding a merchant for use of services of a commerce platform system.

FIG. 4 is a flow diagram of one embodiment of a method for generating one or more user interfaces for onboarding a merchant for use of services of a commerce platform system. The method 400 is performed by processing logic that may comprise hardware (circuitry, dedicated logic, etc.), software (such as is run on a general purpose computer system or a dedicated machine), firmware, or a combination. In one embodiment, the method 400 is performed by user device (e.g., user device 250).

Referring to FIG. 4, processing logic begins by transmitting, by a user device to a commerce platform system, a request for creating a merchant account that onboards the merchant for use of services provided by the commerce platform system (processing block 402). As discussed herein, the request may be initiated via a web interface provided by commerce platform to a merchant system. Furthermore, the request may include initial merchant account information, such as a type of account to be established, name of the account, login credentials, etc.

In response to executing an onboarding user interface received from the commerce platform, processing logic establishes a merchant context for the merchant account, wherein the merchant context stores a copy of the merchant account data for the merchant account (processing block 404). In embodiments, the merchant context is a data structure that maintains merchant account data for an account being established, and serves as a local cache or copy of onboarding account data obtained during the onboarding process. In embodiments, the account data collected during onboarding and stored in the merchant context is also transmitted to the commerce platform system for persistent storage in, for example, a merchant accounts data store In embodiments, a merchant context is capable of holding all types of account information for all types of accounts. However, embodiments discussed herein are configured to minimize the amount of data collected during onboarding and minimizing the time spent and complexity of the onboarding flow, and thus the data collected and/or stored in the merchant context corresponds to a minimum set of data that will bring the account being onboarded into a compliance state with the commerce platform as defined in a commerce platform compliance plan.

Processing logic determines, based on data stored in the merchant context, a composition that renders one of a plurality of different user interfaces for collecting a set of the merchant account data associated with the composition (processing block 406). In embodiments, the composition is used to rendered a form for collection of account data, and is selected from a set of all available compositions. The composition is selected by processing logic, for example by a composition manager as discussed herein, because it is applicable to generating a user interface for capturing account data for the account type being onboarded. Processing logic further determines a subset of merchant account data from the set that is required to comply with a minimum set of account information that will enable the commerce platforms system to perform the services for the merchant (processing block 408). As discussed herein, not all compositions and not all fields for the form(s) that make up a composition are needed to obtain the minimum data required to bring a merchant account into compliance at the commerce platform. Thus, only the data that is relevant to bring the new merchant account into a compliance state, and which is collected by the selected composition is determined by processing logic. In embodiments, form field attributes may be set indicating the applicability/non-applicability to a specific user interface to be generated for and/or rendered by a user device. In embodiments, the set of data needed to comply with a commerce platform compliance plan is determined by one or more API requests issued to APIs of the commerce platform, which generate responses with data required by the commerce platform to bring an account into compliance. In embodiments, the API(s) of the commerce platform interface with the commerce platform compliance plan(s) (e.g., the rules, logic, etc. defining what account data is needed for different plan), and return responses indicating the outstanding data needed to bring an account into compliance. Furthermore, API responses may also be used by the API(s) of commerce platform to deliver data known about an account, user, company, etc. that is the subject of the onboarding. That is, the APIs may provide data relevant to the onboarding, such that it can be added to a merchant context and used by processing logic when determining composition and field applicability, as discussed herein.

Processing logic renders a first user interface generated by the commerce platform system for collecting the subset of merchant account information associated with the composition (processing block 410). In embodiments, the first user interface is an interface in a sequence of one or more onboarding user interfaces, where the sequence defines an onboarding flow. For example, processing logic of a composition manager determines the stage of onboarding and selects the appropriate composition in a sequence of compositions that will collect the subset of information. Furthermore, the first user interface is configured to request only relevant account data for the account being onboarded, for example only those fields indicated in the API responses as being needed and for which data is not already stored in a local merchant context, so that the minimum set of account data that will bring the account into a compliance state at the commerce platform is rendered for collection within the first user interface.

Processing logic receives, by the user device, account information for the subset of merchant account data from the user interface (processing block 412). In embodiments, data entered into a rendered form in an onboarding window is used to update the merchant context with the received account information (processing block 414). In embodiments, the received account information is written to the merchant context for the account being established. Furthermore, the data written to the account may cause processing logic (e.g., a composition) to update a commerce platform's accounts data store via one or more API based messages. In embodiments, the composition manager may, in response to the data entered by a user, update the flow, add one or more compositions, remove one or more compositions, etc. based on the new state of an account being onboarded as reflected in the update merchant context. For example, account data written to a merchant context may specify that an account associated with a first user is further to be associated with a second user. In response to this input data, a new user (e.g. the second user) may be added to the merchant context, and based on API messaging, information about the new user is indicated as required. The newly required data is then collected via a new composition and/or current composition configured to collect the new information. For example, the process illustrated in FIG. 3B may be repeated for the new user in order to render an appropriate window for collecting the user's account information. Furthermore, compositions and/or fields that at one point may have been applicable in an onboarding flow may be removed and/or deselected for generation of a user interface based on updates to merchant context. The selection of compositions, forms, and associated fields within forms based on account state and compliance plans enables processing logic to adapt to current account state while minimizing input requirements during an onboarding process, as discussed herein. Additionally, by maintaining a local copy of a merchant context at the user device, the number and/or timing of API request is reduced, thereby reducing the time required to obtain account related data. For example, a composition manager and selected compositions may consult the merchant context prior to issuing API requests in the event data that would otherwise be subject to the request is already available in the merchant context. As a result, non-essential API requests can be eliminated saving both bandwidth and compute resources of the commerce platform. Furthermore, in embodiments, API requests may supply additional information that is added to the merchant context, even though such information is not specifically requested. However, by populating the merchant context with such information, again later compositions, API requests, forms, and/or form fields, may be avoided.

Figure 5:
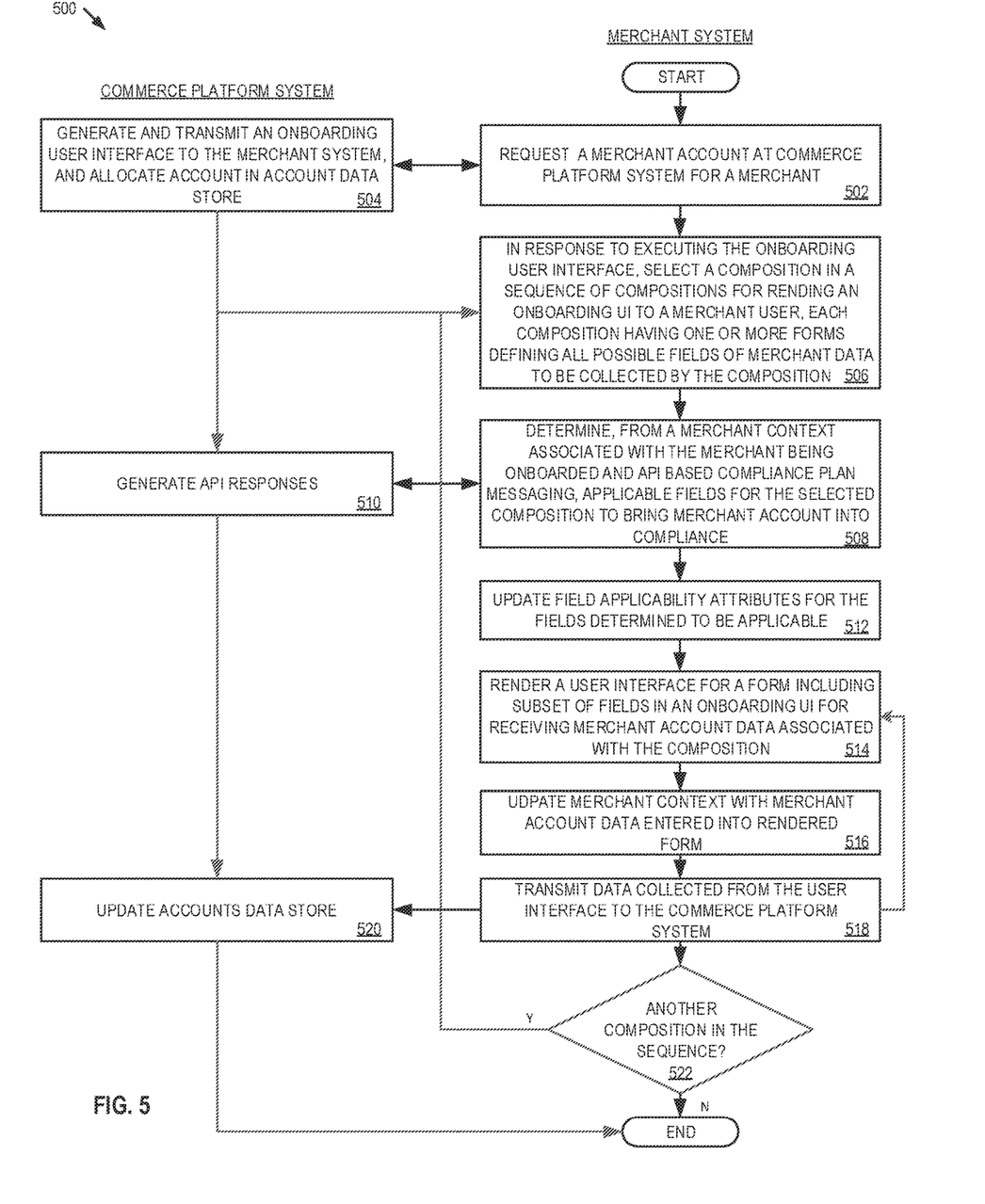
FIG. 5 is a flow diagram of another embodiment of a method for generating one or more user interfaces for onboarding a merchant for use of services of a commerce platform system.

FIG. 5 is a flow diagram of another embodiment of a method 500 for generating one or more user interfaces for onboarding a merchant for use of services of a commerce platform system. The method 500 is performed by processing logic that may comprise hardware (circuitry, dedicated logic, etc.), software (such as is run on a general purpose computer system or a dedicated machine), firmware, or a combination. In one embodiment, the method 500 is performed by a commerce platform (e.g., commerce platform 110 or 210) and a user device (e.g., user device 250, merchant user device 120, agent user device 130, or authorization network user device 140). However, to avoid obscuring the embodiments of the present invention, the below discussion will be directed to onboarding of a merchant account by a merchant system.

Referring to FIG. 5, processing logic of a merchant system begins by requesting a merchant account at a commerce platform system for the merchant (processing block 502). In an embodiment, the request may be generated by a web based user interface provided by the commerce platform system to the merchant system (not shown), such as a web page offering to create a new account for the merchant system. Furthermore, the request may be accompanied by initial account opening details, such as a specific type of account to be opened, an identity of the merchant, etc.

Processing logic of the commerce platform system generates and transmits an onboarding user interface to the merchant system, and allocates the new account in an account data store (processing block 504). In embodiments, the onboarding user interface is an encoded web page based user interface, such as a REACT™ based web page application. Furthermore, the web page based user interface is encoded with a composition manager and a sequence of compositions that are dynamically selectable and configurable during execution at the merchant system, as discussed herein.

Processing logic of the merchant system, in response to executing the onboarding user interface, selects a composition in a sequence of compositions for rendering an onboarding user interface (UI) to a merchant user, where each composition has one or more forms defining all possible fields of merchant data to be collected by the composition (processing block 506). In embodiments, as discussed herein, execution of the onboarding user interface further allocates a merchant context within the merchant system, which services as a cache or local copy of merchant account data received from commerce platform and/or from one or more user interfaces rendered during an onboarding process.

Processing logic further determines, from the merchant context and API based compliance plan messaging (where a compliance plan defines minimum account data requirements for a given account type at the commerce platform, and specific requirements are obtained by the merchant system from the commerce platform via the API based messaging), applicable fields for the selected composition to bring the merchant account into compliance (processing block 508). In embodiments, selected compositions interact with commerce platform by issuing one or more API based requests, and then receiving API based responses generated by the commerce platform system (processing block 510). In embodiments, the API based responses include an indication of data fields needed to satisfy a compliance state. Furthermore, the APIs of the commerce platform system interact with one or more compliance plan to determine the compliance related data.

In embodiments, based on merchant context and the account type being onboard, one or more compositions in a sequence are selected at processing block 506, for example by a composition manager. As discussed above, compositions define stages of data collection during onboarding and each composition is responsible for generating an onboarding user interface. Furthermore, each composition is composed of one or more forms that each include a set of fields defining all possible fields of account data that can be collected by the compositions. However, because although a composition may be applicable to account data collection, not all forms and/or fields within the composition are applicable for a specific account/account type being onboarded.

Processing logic uses the determination of applicable fields to update field applicability attributes of the fields in the forms of the composition (processing block 512). Once the updating is performed, processing logic renders a user interface for a form that includes a subset of fields in an onboarding UI for receiving merchant account data associated with the composition (processing block 514). In embodiments, the fields may include their own rules, which based on data stored in the merchant context and/or received via the API based messaging, may be used by processing logic when generating a UI to, for example, reorder month, day, and year based on country of origin specified in a merchant context (e.g., MM/DD/YYYY in the U.S., and YYYY-MM-DD in Europe), change a label rendered within an input field based on country of origin for a new account (e.g., social security number in the U.S., compared to social insurance number in Canada), the ability to change a home address (e.g., an individual account may not have a different home address, whereas a corporation could have different addresses), etc.

Processing logic of the merchant system updates a merchant context with merchant account data entered into the rendered form (processing block 516), and further transmits data collected from the user interface to the commerce platform system (processing block 518). In embodiments, the transmission of the collected account data may be via one or more API based messages, as discussed herein, enabling processing logic of the commerce platform to update account data maintained in a persistent account data store (processing block 520).

Processing blocks 514-518 repeat, as necessary, as processing logic of the merchant system completes a sequence of one or more forms associated with a composition.

Processing logic determines whether there is another composition in the sequence (processing block 522). In embodiments, processing block 522 enables processing logic to determine whether a composition in the sequence should be selected and repeated in response to received account data (e.g., an account opener composition receives an update to add a new/second user may cause the account opener composition to repeat the collection of user account data) (processing block 506), or after collection of account data for the composition, processing logic can determine that a next composition in the sequence should be selected (processing block 506). However, when there are no additional compositions in the sequence, the process ends.

In embodiments, if any data in an applicable field is not received by processing logic, in embodiments, such outstanding data is added to listing of additional required data to satisfy the onboarding minimum compliance state requirements. In embodiments, another user interface may be presented to the merchant user at onboarding to collect such information, or the merchant user is redirected back to processing block 504 to repeat the onboarding flow. However, since processing logic dynamically selects compositions, forms, and fields, and presents only those user interfaces to collect the outstanding data, the resulting second onboarding flow is much shorter and simpler to complete to bring the merchant account into compliance at the commerce platform Although discussed in the context of merchant account establishment, the processes of FIGS. 4 and 5 may be used to onboard other types of accounts (e.g., agent accounts, banking accounts, authorization network accounts, etc.), as well as to onboard accounts for other non-commerce related systems. The techniques herein are extensible to other systems in which account onboarding is to be performed.

Figure 6:
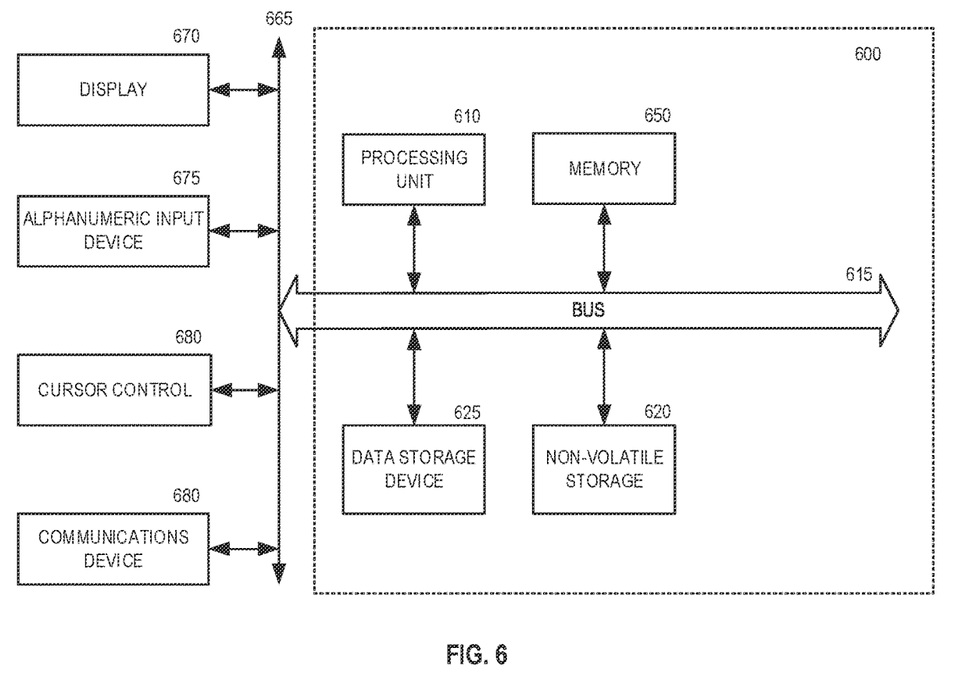
FIG. 6 is one embodiment of a computer system that may be used to support the systems and operations discussed herein.

FIG. 6 is one embodiment of a computer system that may be used to support the systems and operations discussed herein. For example, the computer system illustrated in FIG. 6 may be used by a commerce platform system, a merchant system, etc. It will be apparent to those of ordinary skill in the art, however that other alternative systems of various system architectures may also be used.

The data processing system illustrated in FIG. 6 includes a bus or other internal communication means 615 for communicating information, and a processor 610 coupled to the bus 615 for processing information. The system further comprises a random access memory (RAM) or other volatile storage device 650 (referred to as memory), coupled to bus 615 for storing information and instructions to be executed by processor 610. Main memory 650 also may be used for storing temporary variables or other intermediate information during execution of instructions by processor 610. The system also comprises a read only memory (ROM) and/or static storage device 620 coupled to bus 615 for storing static information and instructions for processor 610, and a data storage device 625 such as a magnetic disk or optical disk and its corresponding disk drive. Data storage device 625 is coupled to bus 615 for storing information and instructions.

The system may further be coupled to a display device 670, such as a light emitting diode (LED) display or a liquid crystal display (LCD) coupled to bus 615 through bus 665 for displaying information to a computer user. An alphanumeric input device 675, including alphanumeric and other keys, may also be coupled to bus 615 through bus 665 for communicating information and command selections to processor 610. An additional user input device is cursor control device 680, such as a touchpad, mouse, a trackball, stylus, or cursor direction keys coupled to bus 615 through bus 665 for communicating direction information and command selections to processor 610, and for controlling cursor movement on display device 670.

Another device, which may optionally be coupled to computer system 600, is a communication device 690 for accessing other nodes of a distributed system via a network. The communication device 690 may include any of a number of commercially available networking peripheral devices such as those used for coupling to an Ethernet, token ring, Internet, or wide area network. The communication device 690 may further be a null-modem connection, or any other mechanism that provides connectivity between the computer system 600 and the outside world. Note that any or all of the components of this system illustrated in FIG. 6 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 650, mass storage device 625, or other storage medium locally or remotely accessible to processor 610.

It will be apparent to those of ordinary skill in the art that the system, method, and process described herein can be implemented as software stored in main memory 650 or read only memory 620 and executed by processor 610. This control logic or software may also be resident on an article of manufacture comprising a computer readable medium having computer readable program code embodied therein and being readable by the mass storage device 625 and for causing the processor 610 to operate in accordance with the methods and teachings herein.

The embodiments discussed herein may also be embodied in a handheld or portable device containing a subset of the computer hardware components described above. For example, the handheld device may be configured to contain only the bus 615, the processor 610, and memory 650 and/or 625. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 610, a data storage device 625, a bus 615, and memory 650, and only rudimentary communications mechanisms, such as a small touch-screen that permits the user to communicate in a basic manner with the device. In general, the more special-purpose the device is, the fewer of the elements need be present for the device to function.

Figure 7:
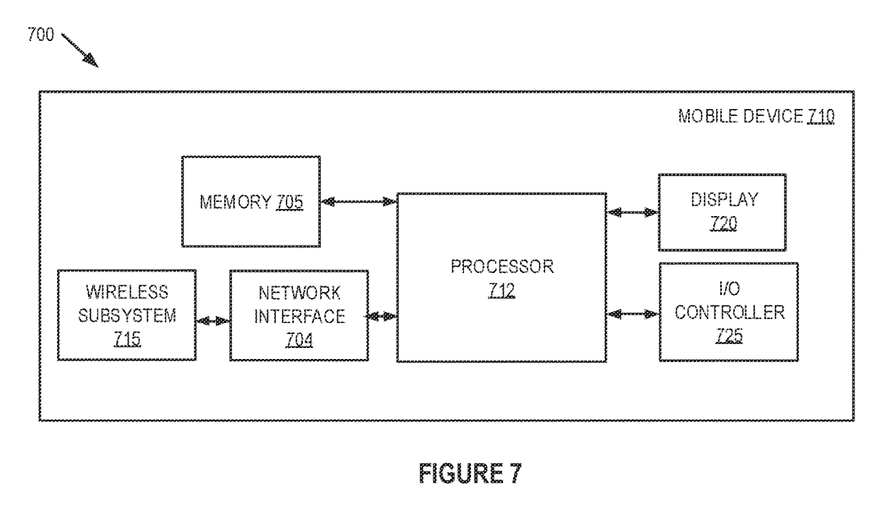
FIG. 7 is one embodiment of a mobile device that may be used to support the systems and operations discussed herein.

FIG. 7 is block diagram of one embodiment 700 of a mobile device. Mobile device 710 may be used, for example, as a merchant user device when interacting with the commerce platform system during onboarding. Furthermore, form components, fields, etc. may be additionally wrapped with tools that adapt their display within a form based on rendering on mobile device 710, as compared to when rendered by computer system 600. For example, when rendered on a mobile device, the user interfaces discussed herein may include larger buttons and inputs. As another example, buttons in footers may be stacked in a mobile rendering as compared to aligned horizontally in a rendering by other computing device.

In one embodiment, mobile device 710 is a system, which may include one or more processors 712, a memory 705, I/O controller 725, network interface 704, and display 720. Mobile device 710 may also include a number of processing modules, which may be implemented as hardware, software, firmware, or a combination. It should be appreciated that mobile device 710 may also include, although not illustrated, a user interface (e.g., keyboard, touch-screen, or similar devices), a power device (e.g., a battery), as well as other components typically associated with electronic devices. Network interface 704 may also be coupled to a number of wireless subsystems 715 (e.g., Bluetooth™, Wi-Fi, Cellular, or other networks) to transmit and receive data streams through a wireless link to/from a network, or may be a wired interface for direct connection to networks (e.g., the Internet, Ethernet, or other wireless systems). In one embodiment, both network interface 704 and wireless subsystem 715 couple mobile device 710 to a network.

Memory 705 may be coupled to processor 712 to store instructions for execution by processor 712. In some embodiments, memory 705 is non-transitory. It should be appreciated that embodiments as described herein may be implemented through the execution of instructions, for example as stored in the memory 705 or other element, by processor 712 of mobile device 710 and/or other circuitry of mobile device 710 and/or other devices. Particularly, circuitry of mobile device 710, including but not limited to processor 712, may operate under the control of a program, routine, or the execution of instructions to execute methods or processes in accordance with the embodiments described herein. For example, such a program may be implemented in firmware or software (e.g. stored in memory 705 and/or other locations) and may be implemented by processors, such as processor 712, and/or other circuitry of mobile device 710. Further, it should be appreciated that the terms processor, microprocessor, circuitry, controller, etc., may refer to any type of logic or circuitry capable of executing logic, commands, instructions, software, firmware, functionality and the like.

Further, it should be appreciated that some or all of the functions, engines or modules described herein may be performed by mobile device 710 itself and/or some or all of the functions, engines or modules described herein may be performed by another system connected through I/O controller 725 or network interface 704 (wirelessly or wired) to mobile device 710. Thus, some and/or all of the functions may be performed by another system and the results or intermediate calculations may be transferred back to mobile device 710. In some embodiments, such other device may comprise a server, such as commerce platform 110 or 210.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

We claim:

1. A method for generating one or more user interfaces, comprising:
    initiating an execution of a sequence of one or more onboarding user interfaces for establishing a user account for use a service of a service provider system;
    allocating, in a memory of a user system, an account data context that stores a local copy of user account data for the user account being established;
    selecting, based on a type of the user account being established, a sequence of compositions that successively render corresponding onboarding user interfaces for collecting the user account data;
    querying the service provider system to determine a subset of the user account data that is required to comply with a minimum set of user account data that will enable the service provider system to perform the service for a user and is not available within the account data context stored in the memory of the user system;
    rendering, by the sequence of compositions, a sequence of the corresponding onboarding user interfaces for collecting the subset of user account data; and
    updating the account data context with user account data received via sequence of the corresponding onboarding user interfaces.

2. The method of claim 1, wherein rendering, by the sequence of compositions, the sequence of the corresponding onboarding user interfaces, comprises:
    rendering, by a first composition in the sequence of compositions, a first user interface for collecting a first portion of the subset of the user account data;
    receiving user account data for the first portion of the subset of the user account; and
    updating the account data context with the received first portion of the subset of the user account data.

3. The method of claim 2, further comprising:
    rendering, by a second composition that occurs after the first composition in the sequence of compositions, a second user interface for collecting a second portion of the subset of the user account data;
    receiving user account data for the second portion of the subset of the user account data;
    updating the account data context with the received second portion of the subset of the user account data; and
    continuing to render, by successive compositions that occur after the second composition in the sequence of compositions, successive user interfaces for collecting additional portions of the subset of the user account.

4. The method of claim 3, further comprising:
    determining when the subset of the user account data has been collected; and
    causing the service provider system to enable the service of the service provider system for the user.

5. The method of claim 1, wherein each composition in the sequence of compositions is associated with one or more forms, each form comprising a set of fields corresponding to collectable user account data, and each field of said each form comprises a field applicability attribute that defines whether said each field is to be rendered by said each form in a user interface for collecting a corresponding element of user account data.

6. The method of claim 5, wherein querying the service provider system, further comprises:
    transmitting, by a composition in the sequence of compositions, a first application programming interface (API) message to the service provider system, the first API message executed by the service provider system to determine a portion of user account data to be collected by the composition;
    receiving, from the service provider system in response to the service provider system executing the first API message, compliance data indicative of the portion of user account data to be collected by the composition, the portion of user account data less than all user account data collectible by the composition;

updating field applicability attributes of a subset of fields of a form associated with the composition to define a subset of fields that are to be rendered in the form, wherein the updating is based on: (i) the portion of user account data to be collected by the composition, and (ii) whether user account data associated with a field in the portion of user account data to be collected by the composition is available in the account data context; and rendering, by the composition in the user interface, the form having the subset of fields.

7. The method of claim 6, further comprising:

receiving, via the form rendered by the composition, user account data associated with the subset of fields;

updating the user account data context with the user account data associated with the subset of fields;

transmitting a second API message to the service provider system that comprises the user account data associated with the subset of fields, wherein the user account data associated with the subset of fields is stored in the user account in a user accounts data store of the service provider system.

8. The method of claim 6, further comprising:

receiving, from the service provider system in response to the service provider system executing the first API message, existing user account data stored by the service provider system and relevant to the user account data to be collected by the composition;

updating the user account data context with the received existing user account data; and the updating the field applicability attributes further comprises updating additional field applicability attributes of the subset of fields of the form to indicate that user account data associated with the received existing user account data is not required to be collected by the composition.

9. The method of claim 1, wherein the subset of user the account data is determined based on a compliance plan maintained by the service provider system for the type of the user account being established, and wherein the compliance plan defines the minimum set of user account data that will enable the service provider system to perform the service for the user.

10. The method of claim 1, wherein the sequence of compositions represents a subset of all available compositions configured for collecting user account information for any of a plurality of different types of user accounts.

11. The method of claim 1, wherein the sequence of compositions and the subset of user account data is determined based on the type of the user account being established, an onboarding state of the user account based on the account data context, and progress through the sequence of compositions.

12. The method of claim 1, wherein the service provider system comprises a commerce platform, and the user account comprises a merchant system account for use of one or more services of the commerce platform.

13. A system that generates one or more user interfaces, the system comprising:

a memory that stores merchant account data; and
a processor coupled with the memory configured to:

initiate an execution of a sequence of one or more onboarding user interfaces for establishing a user account for use a service of a service provider system, allocate, in the memory, an account data context that stores a local copy of user account data for the user account being established, select, based on a type of the user account being established, a sequence of compositions that successively render corresponding onboarding user interfaces for collecting the user account data, querying the service provider system to determine a subset of the user account data that is required to comply with a minimum set of user account data that will enable the service provider system to perform the service for a user and is not available within the account data context stored in the memory of the user system, render, by the sequence of compositions, a sequence of the corresponding onboarding user interfaces for collecting the subset of user account data, and update the account data context with user account data received via sequence of the corresponding onboarding user interfaces.

14. The system of claim 13, wherein the processor configured to render, by the sequence of compositions, the sequence of the corresponding onboarding user interfaces, further comprises the processor configured to:

render, by a first composition in the sequence of compositions, a first user interface for collecting a first portion of the subset of the user account data;

receive user account data for the first portion of the subset of the user account; and update the account data context with the received first portion of the subset of the user account data.

15. The system of claim 13, wherein each composition in the sequence of compositions is associated with one or more forms, each form comprising a set of fields corresponding to collectable user account data, and each field of said each form comprises a field applicability attribute that defines whether said each field is to be rendered by said each form in a user interface for collecting a corresponding element of user account data.

16. The system of claim 15, wherein the processor configured to query the service provider system, further comprises the processor configured to:

transmit, by a composition in the sequence of compositions, a first application programming interface (API) message to the service provider system, the first API message executed by the service provider system to determine a portion of user account data to be collected by the composition;

receive, from the service provider system in response to the service provider system executing the first API message, compliance data indicative of the portion of user account data to be collected by the composition, the portion of user account data less than all user account data collectible by the composition;

update field applicability attributes of a subset of fields of a form associated with the composition to define a subset of fields that are to be rendered in the form, wherein the updating is based on: (i) the portion of user account data to be collected by the composition, and (ii) whether user account data associated with a field in the portion of user account data to be collected by the composition is available in the account data context; and render, by the composition in the user interface, the form having the subset of fields.

17. A non-transitory computer readable storage medium including instructions that, when executed by a processor, cause the processor to perform a method for generating one or more user interfaces, the method comprising:
  initiating an execution of a sequence of one or more onboarding user interfaces for establishing a user account for use a service of a service provider system;
  allocating, in a memory of a user system, an account data context that stores a local copy of user account data for the user account being established;
  selecting, based on a type of the user account being established, a sequence of compositions that successively render corresponding onboarding user interfaces for collecting the user account data;
  querying the service provider system to determine a subset of the user account data that is required to comply with a minimum set of user account data that will enable the service provider system to perform the service for a user and is not available within the account data context stored in the memory of the user system;
  rendering, by the sequence of compositions, a sequence of the corresponding onboarding user interfaces for collecting the subset of user account data; and
  updating the account data context with user account data received via sequence of the corresponding onboarding user interfaces.

18. The non-transitory computer readable storage medium of claim 17, wherein rendering, by the sequence of compositions, the sequence of the corresponding onboarding user interfaces, comprises:
  rendering, by a first composition in the sequence of compositions, a first user interface for collecting a first portion of the subset of the user account data;
  receiving user account data for the first portion of the subset of the user account; and
  updating the account data context with the received first portion of the subset of the user account data.

19. The non-transitory computer readable storage medium of claim 17, wherein each composition in the sequence of compositions is associated with one or more forms, each form comprising a set of fields corresponding to collectable user account data, and each field of said each form comprises a field applicability attribute that defines whether said each field is to be rendered by said each form in a user interface for collecting a corresponding element of user account data.

20. The non-transitory computer readable storage medium of claim 19, wherein querying the service provider system, further comprises:
  transmitting, by a composition in the sequence of compositions, a first application programming interface (API) message to the service provider system, the first API message executed by the service provider system to determine a portion of user account data to be collected by the composition;
  receiving, from the service provider system in response to the service provider system executing the first API message, compliance data indicative of the portion of user account data to be collected by the composition, the portion of user account data less than all user account data collectible by the composition;
  updating field applicability attributes of a subset of fields of a form associated with the composition to define a subset of fields that are to be rendered in the form, wherein the updating is based on: (i) the portion of user account data to be collected by the composition, and (ii) whether user account data associated with a field in the portion of user account data to be collected by the composition is available in the account data context; and
  rendering, by the composition in the user interface, the form having the subset of fields.

* * * * *